(12) United States Patent
Chan (10) Patent No.: US 10,887,107 B1
(45) Date of Patent: Jan. 5, 2021

(54) PROOF-OF-WORK FOR SECURING IOT AND AUTONOMOUS SYSTEMS

(71) Applicant: National Technology & Engineering Solutions of Sandia, LLC, Albuquerque, NM (US)

(72) Inventor: Calvin Chan, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 150 days.

(21) Appl. No.: 15/980,505

(22) Filed: May 15, 2018

Related U.S. Application Data (60) Provisional application No. 62/568,441, filed on Oct. 5, 2017.

(51) Int. Cl.
*H04L 9/32* (2006.01)
*H04L 9/08* (2006.01)

(52) U.S. Cl.
CPC .......... *H04L 9/3236* (2013.01); *H04L 9/0816* (2013.01); *H04L 9/3255* (2013.01); *H04L 9/3271* (2013.01); *H04L 2209/38* (2013.01)

(58) Field of Classification Search
CPC ... H04L 9/3236; H04L 9/0816; H04L 9/3255; H04L 9/3271; H04L 2209/38
See application file for complete search history.

(56) References Cited

U.S. PATENT DOCUMENTS

| | | | |
|---|---|---|---|
| 8,667,088 B1* | 3/2014 | Maniscalco | H04L 65/605 709/219 |
| 9,716,595 B1 | 7/2017 | Kravitz et al. | |
| 9,807,092 B1* | 10/2017 | Gutzmann | H04L 63/10 |
| 10,002,277 B1* | 6/2018 | Endress | H04L 9/3278 |
| 10,313,117 B1* | 6/2019 | Carlough | H04L 63/10 |
| 2006/0294390 A1* | 12/2006 | Navratil | G06F 21/31 713/182 |
| 2008/0199011 A1* | 8/2008 | Tuyls | G06K 7/0008 380/268 |
| 2010/0201543 A1* | 8/2010 | Shorey | G08G 1/161 340/902 |

(Continued)

OTHER PUBLICATIONS

Beaulieu, Ray, et al., "The Simon and Speck Families of Lightweight Block Ciphers", National Security Agency Publication, Jun. 19, 2013, 45 pages.

(Continued)

*Primary Examiner* — Darshan I Dhruv
(74) *Attorney, Agent, or Firm* — Madelynne J. Farber; Mark A. Dodd (57) ABSTRACT

A first device in a network issues a proof-of-work challenge to a second device in the network. The second device computes a cryptographic function result to satisfy a criterion indicated in the challenge. The second device returns a challenge response comprising inputs to the cryptographic function that the second device used to compute the cryptographic function result satisfying the criterion. The first device, upon receiving the challenge response, verifies that the inputs to the cryptographic function yield a result satisfying the criterion. Responsive to verifying the challenge response, the first device updates a blockchain based upon the challenge response.

15 Claims, 7 Drawing Sheets

(56) References Cited

U.S. PATENT DOCUMENTS

| | | | |
|---|---|---|---|
| 2011/0055585 A1* | 3/2011 | Lee | H04L 9/0844 713/183 |
| 2012/0045057 A1* | 2/2012 | Brown | H04L 9/3236 380/255 |
| 2012/0124385 A1* | 5/2012 | Klasen | H04L 9/3236 713/179 |
| 2012/0260345 A1* | 10/2012 | Quinn | G06F 21/79 726/26 |
| 2013/0028411 A1* | 1/2013 | Arkko | H04W 4/08 380/28 |
| 2013/0151849 A1* | 6/2013 | Graham | H04L 9/32 713/164 |
| 2013/0205370 A1* | 8/2013 | Kalgi | H04L 63/12 726/3 |
| 2013/0290706 A1* | 10/2013 | Socky | H04L 63/0823 713/158 |
| 2014/0109182 A1* | 4/2014 | Smith | H04L 63/1416 726/3 |
| 2014/0186054 A1* | 7/2014 | Teng | H04J 14/08 398/139 |
| 2014/0208394 A1* | 7/2014 | Goodwin | H04L 63/08 726/4 |
| 2014/0298420 A1* | 10/2014 | Barton | G06F 21/53 726/4 |
| 2015/0082399 A1* | 3/2015 | Wu | H04L 9/0897 726/6 |
| 2015/0089239 A1* | 3/2015 | Yang | G06F 21/34 713/184 |
| 2015/0324789 A1 | 11/2015 | Dvorak et al. | |
| 2016/0086175 A1* | 3/2016 | Finlow-Bates | G06Q 20/401 705/77 |
| 2016/0099950 A1* | 4/2016 | Cuff | H04L 63/0838 726/7 |
| 2016/0275461 A1 | 9/2016 | Sprague et al. | |
| 2016/0321654 A1 | 11/2016 | Lesavich et al. | |
| 2017/0013012 A1* | 1/2017 | Hansen | G06F 21/31 |
| 2017/0033926 A1* | 2/2017 | Fu | H04L 9/0858 |
| 2017/0132068 A1* | 5/2017 | Parra | H04L 41/145 |
| 2017/0237770 A1* | 8/2017 | Meriac | H04L 63/10 726/23 |
| 2017/0279818 A1* | 9/2017 | Milazzo | H04L 63/145 |
| 2018/0115539 A1* | 4/2018 | Muhanna | H04L 63/0876 |
| 2018/0158058 A1* | 6/2018 | Kogure | G06Q 20/3829 |
| 2018/0183587 A1* | 6/2018 | Won | H04L 9/0891 |
| 2018/0183601 A1* | 6/2018 | Campagna | H04L 63/1441 |
| 2018/0198632 A1* | 7/2018 | Gajek | H04L 9/30 |
| 2018/0336552 A1* | 11/2018 | Bohli | H04L 67/1097 |

OTHER PUBLICATIONS

Gordon, Gilroy, "Provenance and Authentication of Oracle Sensor Data with Block Chain Lightweight Wireless Network Authentication Scheme for Constrained Oracle Sensors", Masters Thesis, Jan. 2017, 222 pages.

\* cited by examiner

PROOF-OF-WORK FOR SECURING IOT AND AUTONOMOUS SYSTEMS

RELATED APPLICATIONS

This application claims priority to U.S. Provisional Patent Application No. 62/568,441 filed on Oct. 5, 2017, and entitled "PROOF-OF-WORK FOR SECURING IOT AND AUTONOMOUS SYSTEMS", the entirety of which is incorporated herein by reference.

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

As computing devices become smaller in size and wireless Internet connectivity is easier to achieve in a greater number of places, a wide range of devices are being equipped for network connectivity in an Internet-of-Things (IoT). Similarly, industrial control systems (ICS), supervisory control and data acquisition (SCADA) systems, building automation systems (BAS) and other forms of control systems are increasingly interconnected with other networks, such as internal business networks and external networks such as the Internet. These network interconnections can facilitate remote access to information from various sensors or other devices, as well as enabling remote control over a range of device operations and physical processes.

However, the same network interconnections that provide remote data access and control functions with respect to various physical devices can also be used to subvert those devices. For example, an Internet-connected home appliance can be subverted by an attacker to access otherwise private data pertaining to a user's home. In another example, a remote attacker can gain access to a business network and from there subvert devices in an ICS connected to the business network in order to affect a physical process controlled by the ICS.

Conventional network security typically involves one or a combination of several security measures such as strong encryption of communications exchanged on the network. Many conventional computer network security measures are not well suited to securing IoT, ICS, or SCADA networks, however, as these systems commonly incorporate devices with limited computing capacity that are not readily able to perform complex computing operations needed to ensure security.

SUMMARY

The following is a brief summary of subject matter that is described in greater detail herein. This summary is not intended to be limiting as to the scope of the claims.

Various technologies pertaining to proof-of-work-based security in networks of devices are described herein. In an exemplary operational environment, a plurality of devices are connected to a same network and communicate over an unsecured, shared channel. The network can be or include an ICS network, a SCADA network, a BAS network, a local area network (LAN), a wide area network (WAN) such as the Internet, etc. In some embodiments, some of the devices can be considered to be "trusted" whereas other devices may be considered to be "untrusted." A trusted device can be considered to be operating according to desired operational parameters. By contrast, it may be unknown whether an untrusted device is operating according to desired operational parameters for devices on a network or whether the untrusted device is performing functions outside the desired operational parameters. By way of example, a trusted device may be a device that for various reasons may be known or believed by an operator to be unaffected by an attack, whereas it may be uncertain whether an untrusted device is performing or participating in an attack on the network. Exemplary devices include IoT-enabled devices (e.g., network-connected sensors, controllers, actuators, etc.), devices in an ICS, devices in a SCADA system, devices that route network traffic (e.g., routers, switches, hubs, etc.), etc.

In an exemplary embodiment, a network includes a first device and a second device that are in communication by way of an unsecured channel. Stated differently, communications exchanged between the first device and the second device are subject to observation by third-parties that are not intended participants in the communications. During ordinary operation of the first device and the second device on the network, the first device transmits a challenge to the second device. The challenge is a proof-of-work challenge that comprises data indicative of one or more valid responses to the challenge. By way of example, the challenge comprises data indicative of a result characteristic of an output of a predefined cryptographic function computed using an acceptable challenge response as its inputs. Stated differently, the challenge indicates that when an agreed-upon cryptographic function is computed using an acceptable key-message pair, the result of the computation should have the indicated result characteristic.

Responsive to receiving the challenge from the first device, the second device computes a cryptographic function result based upon the challenge. By way of example, and not limitation, the second device executes an iterative key search for a key-message pair that, when used as an input to the predefined cryptographic function yields a cryptographic function result that has the result characteristic indicated in the challenge. In the iterative search, the second device selects a key-message pair (e.g., at random) and computes a cryptographic function result for the key-message pair. For example, the second device encrypts the selected message using the selected key according to an algorithm defined by the cryptographic function, where the cryptographic function result comprises the encrypted message. If the cryptographic function result has the result characteristic indicated in the challenge, the second device transmits a challenge response to the first device. By way of example, the challenge response can include the key-message pair that yielded the cryptographic function result that has the result characteristic indicated in the challenge. If the cryptographic function result does not have the result characteristic indicated in the challenge, the second device selects a new key-message pair and computes a new cryptographic function result. This iterative process continues until the second device computes a cryptographic function result that has the result characteristic indicated in the challenge.

Upon receiving the challenge response from the second device, the first device determines whether the response is an acceptable response to the challenge. Continuing the example above (wherein the challenge response comprises the key-message pair), in order to verify that the challenge response is an acceptable response the first device encrypts the message included in the challenge response using the key indicated in the challenge response according to the algorithm defined by the cryptographic function. The first device then determines if the result of the encryption has the result characteristic indicated in the challenge. If the encryption result has the result characteristic indicated in the challenge, the first device considers the challenge response to be an acceptable response. Upon determining whether the challenge response is an acceptable response, the first device performs one or more computing operations. By way of example, and not limitation, when the first device verifies that the challenge response is acceptable, the first device can transmit a communication to the second device, permit the second device to transmit a communication over the network (e.g., in embodiments where the first device controls traffic on the network), or perform substantially any other computing operation that is desirably performed responsive to verifying the challenge response. In other examples, when the first device determines that the challenge response is not acceptable, the first device can exclude the second device from communicating on the network, output an indication of a potential attack on the network, or the like.

In exemplary embodiments, a device on the network maintains a blockchain that comprises a plurality of blocks, wherein each block is a hash of data comprising a challenge response from another device on the network. By way of example, responsive to determining that a challenge response is acceptable, the device that maintains the blockchain computes a value of a new block to be added to the chain, wherein the value is computed using a hash function based on the challenge response. The blockchain is therefore indicative of challenge responses received by the device that maintains the blockchain over a period of time from other devices on the network.

The systems and methods for proof-of-work-based network security described herein take advantage of idle computing resources (e.g., power, processing cycles, memory, etc.) at each of the communicating devices to generate and/or verify challenge responses without degrading performance of the individual devices. Further, the systems and methods described herein allow potential attacks to be detected and stopped without requiring encryption of a large amount of communication occurring on the network, thereby conserving network bandwidth and computing resources that would otherwise be used for the purposes of encrypting and decrypting network traffic. Still further, the incorporation of challenge/response data into a blockchain allows patterns of challenge/response behavior that may be relevant to network security to be analyzed over a long period of time (e.g., days, weeks, months, etc.) in order to identify patterns of network behavior that may be associated with subversion or degraded performance of network devices.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to proof-of-work-based security in systems of networked computing devices are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

Figure 1:
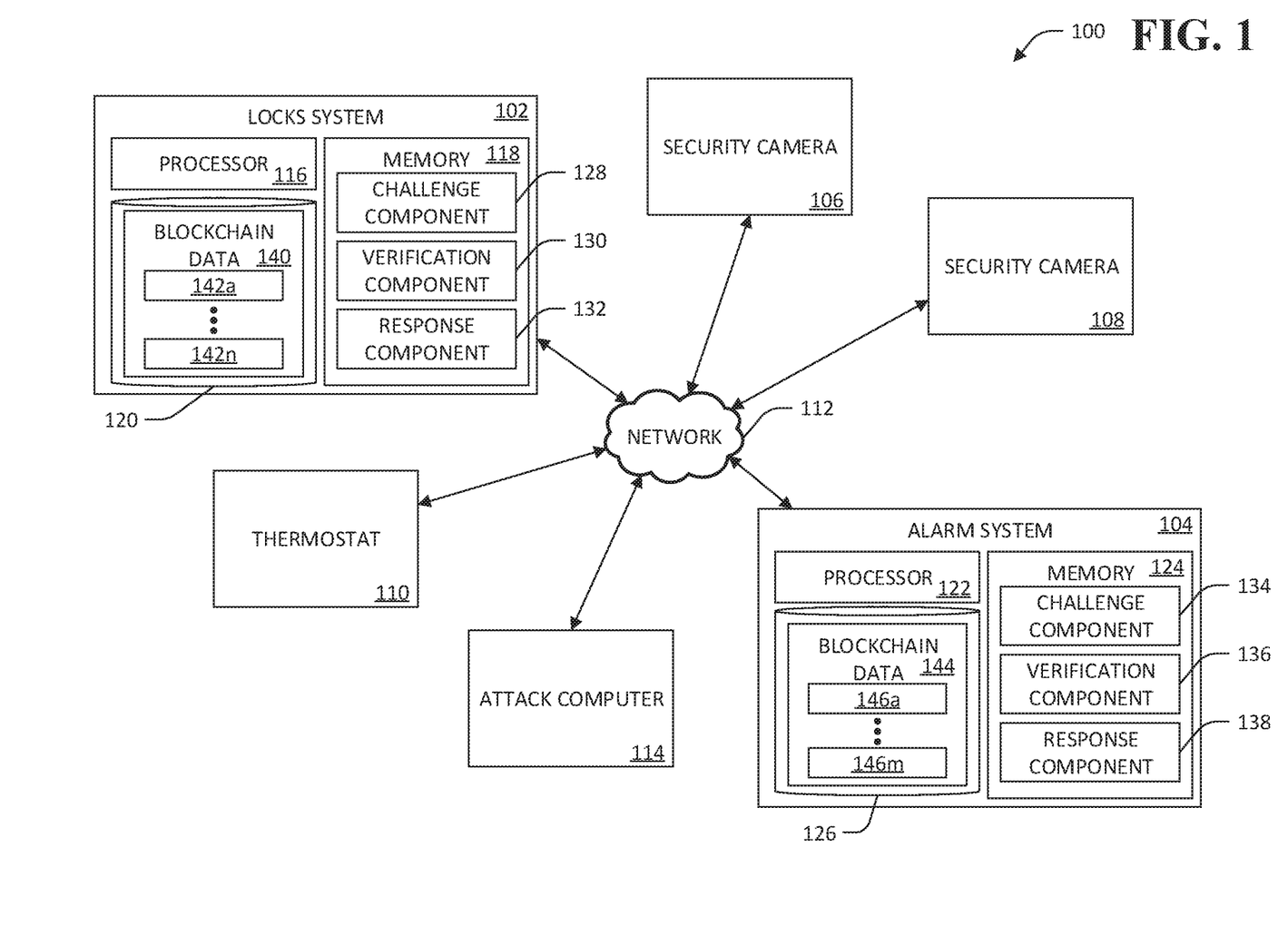
FIG. 1 is a functional block diagram of an exemplary security environment of network-connected devices performing a proof-of-work-based security protocol.

With reference to FIG. 1, an exemplary system 100 of networked devices configured to perform a proof-of-work-based security protocol is illustrated. The system 100 includes a plurality of devices 102-110 that communicate over a network 112. In exemplary embodiments, the network 112 can be or include an ICS network, a SCADA network, a BAS network a local area network (LAN), a wide area network (WAN) such as the Internet, etc. Furthermore, while the network 112 is illustrated as being a single network it is to be understood that the network 112 as shown can represent any of a variety of connections between the devices 102-110. For instance, the network 112 can include a plurality of subnetworks, wherein a communication can be routed among several subnetworks in connection with routing a communication from a first device in the devices 102-110 to a second device in the devices 102-110.

Figure 2:
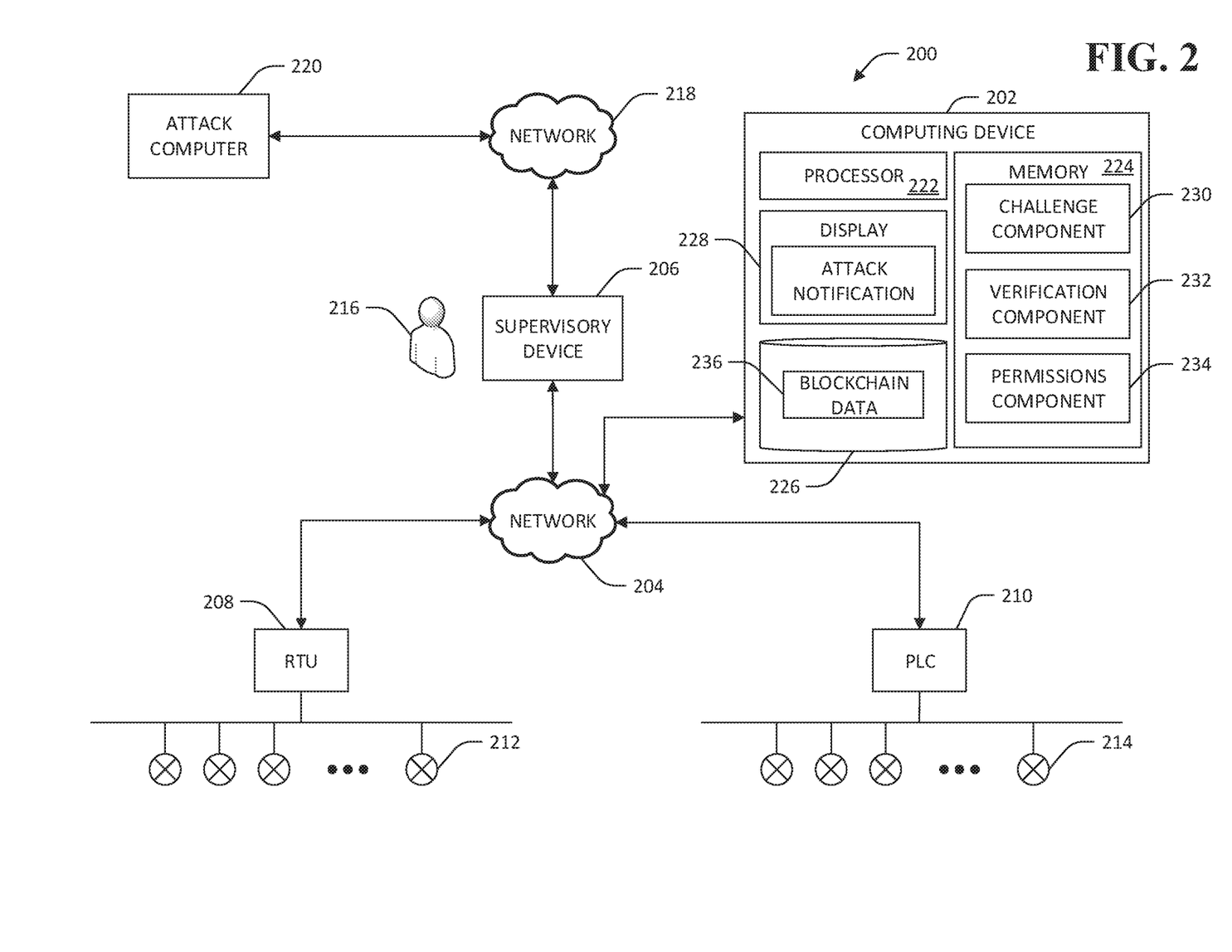
FIG. 2 is a functional block diagram of an exemplary SCADA computing environment that incorporates proof-of-work-based security.

The devices 102-110 can be substantially any devices that can communicate with one another over the network 112. As depicted in the exemplary system 100 of FIG. 1, the devices 102-110 include IoT-enabled devices in a home automation system such as a locks system 102, an alarm system 104, security cameras 106, 108, and a thermostat 110. FIG. 2 depicts an exemplary system 200 wherein devices that incorporate technologies pertaining to a proof-of-work-based security protocol described herein include ICS, SCADA, and BAS devices such as remote terminal units (RTUs), programmable logic controllers (PLCs), and the like. It is to be understood that other types of devices than those depicted in the systems 100, 200 are contemplated as being within the scope of the present disclosure. The devices 102-110 depicted in FIG. 1 are configured to perform various functions relating to building automation.

The devices 102-110 are configured to be able to perform various computational operations to facilitate performance of their various functions. For example, the thermostat 110 can be configured to perform computational operations in connection with controlling a heating and cooling system (not shown) in order to maintain a desired temperature in a room. Each of the devices 102-110 can therefore include computing hardware such as a processor and memory that perform such computational operations. While these computing resources of the devices 102-110 can be used to facilitate the performance of the intended functions of the devices 102-110, they may also be subverted by an attacker that wishes to disrupt such intended functions.

By way of example, the system 100 further includes an attack computer 114 that is controlled by a third-party attacker seeking to subvert operation of the devices 102-110. The attack computer 114 communicates with the devices 102-110 by way of the network 112. The attack computer 114 can initiate an attack on a device in the devices 102-110 by transmitting a communication to the device by way of the network 112. The attack computer 114 can expand the attack into stages by subverting a first device in the devices 102-110, which first device is subsequently caused to transmit communications to a second device in the devices 102-110, where the communications are intended by the attacker to subvert the second device. Thus, an attack may occur in several stages. For example, a first device that is relatively unsecure can be subverted by the attack computer 114, whereupon a second device that is more secure than the first device can be subverted by the first device, which may be a device that is "trusted" by the second device. For instance, the second device can screen communications according to a whitelist, whereas the first device may not screen any communications. If the first device is on the second device's whitelist, then an attacker can subvert the second device by taking control of the first device and causing the first device to transmit attack communications to the second device.

In the exemplary system 100, the locks system 102 comprises a processor 116 and memory 118 that is operably coupled to the processor 116. The locks system 102 can further include a data store 120 that is operably coupled to the processor 116. Similarly, the alarm system 104 comprises a processor 122, memory 124, and a data store 126, the memory 124 and the data store 126 operably coupled to the processor 122. The memory 118 of the locks system 102 comprises a challenge component 128, a verification component 130, and a response component 132. Likewise, the memory 124 of the alarm system 104 comprises a challenge component 134, a verification component 136, and a response component 138. The challenge components 128, 134 transmit challenges to the devices 102-110 in the network 112. The response components 132, 138 generate responses to challenges received from the devices 102-110 and transmit a response to the device that originated the challenge. The verification components 130, 136 determine whether received challenge responses are acceptable responses to the challenges.

Exemplary operations of the locks system 102 and the alarm system 104 in connection with performing a proof-of-work-based challenge-response protocol are now described. The locks system 102 and the alarm system 104 are each configured to perform various aspects of the protocol such that together the locks system 102 and the alarm system 104 jointly perform the protocol. It is to be understood that in the explanation that follows, operations described as being performed by the locks system 102 and the alarm system 104 can be similarly performed by any of the devices 102-110 that are connected to the network 112.

The locks system 102 transmits a challenge to the alarm system 104 by way of the network 112. The challenge is a proof-of-work challenge that requires the alarm system 104 to respond with a challenge response that indicates that the alarm system 104 has performed a computing task based upon the challenge. The alarm system 104 receives the challenge and performs the computing task based upon the challenge. The alarm system 104 generates a challenge response based upon results of performing the computing task, and transmits the challenge response to the locks system 102. Responsive to receiving the challenge response, the locks system 102 verifies the challenge response to determine if the challenge response is an acceptable response. The locks system 102 performs one or more computing operations based upon determining whether the challenge response is an acceptable response to the challenge. By way of example, and not limitation, upon determining that the challenge response is not an acceptable response to the challenge, the locks system 102 can output an indication that the alarm system 104 has been subverted by an attack. The challenge-response protocol described herein is configured such that an acceptable response to a given challenge is relatively difficult to generate whereas verifying that a response satisfies the challenge is relatively easy (e.g., requires fewer computational resources than generating the challenge response).

Details pertaining to the challenge and generation of the challenge response are now set forth. The locks system 102 and the alarm system 104 can be jointly configured such that the alarm system 104 is able to identify that a communication is a security challenge and to generate an acceptable response to the challenge. The challenge component 128 of the locks system 102 generates a challenge that is configured to cause the response component 138 of the alarm system 104 to perform a computing task based upon receiving the challenge.

The computing task is a proof-of-work task whereby completion of the task generates results that are indicative of the task being completed. In an exemplary embodiment, the computing task comprises identifying inputs to a cryptographic function that yield a result that has a predefined result characteristic. In one example, the predefined result characteristic can be a characteristic agreed upon in advance by the locks system 102 and the alarm system 104 (e.g., prior to issuance of the challenge). In another example, the challenge comprises data indicative of the predefined result characteristic. By way of example, the challenge indicates a characteristic that the result of encrypting a message by way of a cryptographic function using a key should have. In the example, the computing task comprises performing an iterative search for a key-message pair that, when the message is encrypted according to the cryptographic function using the key, yields an encrypted message that has the characteristic indicated in the challenge. In the embodiment, the response component 138 of the alarm system 104 selects a key-message pair and computes the cryptographic function based on the key-message pair. The response component 138 performs a check to determine whether the result of computing the cryptographic function has the characteristic indicated in the challenge.

In various exemplary embodiments, the response component 138 selects the key-message pair from a predefined key-message space that is shared by the locks system 102 and the alarm system 104. In some embodiments, the response component 138 selects the key and the message at random from the key-message space. In other embodiments, the response component 138 treats the message as fixed and performs the iterative search over a predefined key space by varying the key from iteration to iteration while the message remains constant. In still other embodiments, the message varies according to context of the challenge. For instance, the message can include or be based upon data in the challenge, a current state of the network (e.g., a timestamp), an identifier of the challenged device (e.g., the alarm system 104), etc.

In exemplary embodiments, the cryptographic function comprises a lightweight cipher. Lightweight ciphers are designed to be optimized for execution by devices with significant constraints on memory, storage, physical area (e.g., area on an integrated circuit chip), power, bandwidth, computations, etc. (e.g., in contrast with devices that commonly have substantial excess computational resources, such as desktop computers). These devices can include devices such as the devices 102-110 referenced above with respect to FIG. 1, devices 206-210 references below with respect to FIG. 2, BAS devices, sensors, RFID tags, wearable devices, etc. Lightweight ciphers include ciphers such as the SPECK family of ciphers or the SIMON family of ciphers described in Beaulieu, et al, "The SIMON and SPECK Families of Lightweight Block Ciphers" published Jun. 19, 2013, available at eprint.iacr.org/2013/404.pdf and other ciphers such as KATAN, PICCOLO, PRESENT, and the like. In various embodiments, the cryptographic function comprises a plurality of cryptographic function operations. In exemplary embodiments, the cryptographic function comprises operations of a lightweight cipher as part of a hash function. By way of an example, the cryptographic function can include operations of the SPECK-128 block cipher as part of a Matyas-Meyer-Oseas one-way compression function.

The response component 138 encrypts the message using the key according to the cryptographic function agreed upon in advance by the locks system 102 and the alarm system 104 (e.g., according to configuration data stored at the locks system 102 and the alarm system 104) to compute the cryptographic function result. Stated symbolically, the response component 138 computes R=f (key, message) where f is the cryptographic function taking the key and message as inputs, and R is the encrypted message, or cryptographic function result. The response component 138 then performs a check of the cryptographic function result to determine if the result has the predefined result characteristic (e.g., agreed by the locks system 102 and alarm system 104 in advance, or as indicated in the challenge). In exemplary embodiments, the predefined result characteristic can be a Hamming weight of the cryptographic function result, a number of leading zeroes in the cryptographic function result, or substantially any other characteristic of the cryptographic function result. If the cryptographic function result has the predefined result characteristic, the response component 138 outputs a challenge response to the locks system 102, the challenge response based upon the computing of the cryptographic function result. For example, the challenge response can include the key and at least a portion of the message encrypted in connection with computing the cryptographic function result.

Responsive to receiving the challenge response from the alarm system 104, the verification component 130 of the locks system 102 determines whether the challenge response is an acceptable challenge response based upon the predefined result characteristic for the cryptographic function result. The verification component 130 can perform various operations based on whether the challenge response is determined to be an acceptable response to the challenge or the challenge is determined not to be an acceptable response to the challenge. For example, responsive to determining that the challenge response is acceptable, the verification component 130 can add the alarm system 104 to a whitelist of devices approved to communicate with the locks system 102. In another example, response to determining that the challenge response is not an acceptable response to the challenge, the verification component 130 adds the alarm system 104 to a blacklist of devices from which communications will be ignored by the locks system 102.

In exemplary embodiments, the verification component 130 updates a locally stored blockchain responsive to determining that the challenge response is an acceptable response to the challenge. The data store 120 comprises blockchain data 140. The blockchain data 140 comprises a plurality of chronologically ordered blocks 142*a*-142*n*, where block 142*a* is the most recently generated of the blocks 142*a*-142*n*. In exemplary embodiments, each of the blocks 142*a*-142*n* comprises a hash of data that includes at least a portion of the data included in the previous block in the blockchain data 140 (e.g., unpictured block 142*b* for block 142*a*), and at least a portion of data included in an acceptable challenge response for which the block was generated. It is to be understood that any of a variety of hash functions can be used to generate the blocks 142*a*-142*n*. Responsive to receiving a challenge response that is an acceptable response to a challenge issued by the challenge component 128, the verification component 130 updates the blockchain data 140 based upon the challenge response (e.g., by generating an additional block to be added to the blockchain data 140). In an example, the response component 138 of the alarm system 104 returns a challenge response that comprises a key and a timestamp indicating when the challenge response was generated by the response component 138. In another example, the response component 138 further includes a hash of a most recent block in blockchain data 144 in the challenge response provided to the locks system 102. The verification component 130 can include some or all of such data in a new block that the verification component 130 adds to the blockchain data 140.

In some embodiments, the devices 102-110 maintain respective locally stored blockchains at the devices 102-110. For example, the alarm system 104 locally stores the blockchain data 144 in the data store 126. The blockchain data 144 comprises a plurality of blocks 146a-146m. In an exemplary embodiment, the locks system 102 and the alarm system 104 independently maintain their respective blockchains 140, 144. Pursuant to an example, when the locks system 102 receives an acceptable challenge response to a challenge issued by its challenge component 128, the locks system 102 adds a new block to its blockchain 140. Continuing the example, when the alarm system 104 receives an acceptable challenge response to a challenge issued by its challenge component 134, the verification component 136 adds a new block to the blockchain 144.

In other embodiments, the locks system 102 and the alarm system 104 maintain their own local copies of a jointly maintained blockchain. Pursuant to another example, each of the devices 102-110 is configured to transmit a new block to the other devices 102-110 on the network 112. For example, upon generating the block 142a, the locks system 102 transmits the block 142a to the alarm system 104. Responsive to receiving the block 142a from the locks system 102, the alarm system 104 updates its blockchain data 144 to include the block 142a. Hence, the devices 102-110 update respective locally stored blockchains based upon blocks generated by other devices 102-110 on the network 112. The devices 102-110 therefore maintain locally stored copies of a same jointly generated blockchain.

The verification components 130, 136 can generate new blocks for their respective blockchains 140, 144 based upon received challenge responses. By way of example, the verification component 130, 136 can generate a new block by executing a hash function over all or part of the data included in a challenge response and/or the challenge that prompted the challenge response. In an exemplary embodiment, the verification components 130 generates a new block to be added to the blockchain data 140 by executing a hash function over data comprising the challenge, the challenge response, and one or more blocks of each of the blockchains 140, 144.

The devices 102-110 can communicate over the network 112 based upon their respective locally stored blockchains. For example, responsive to receiving a request for data from the alarm system 104, the locks system 102 can request a copy of all or part of the blockchain data 144 stored by the alarm system 104. If the locks system 102 and the alarm system 104 stored local copies of a jointly maintained blockchain as described above, the blockchain data 144 should be the same as the blockchain data 140. If the alarm system 104 returns blockchain data to the locks system 102 that is different from the blockchain data 140, the locks system 102 can treat the difference as being indicative of an attack at the alarm system 104. The locks system 102 can deny the request for data from the alarm system 104 based upon the requested blockchain data differing from the blockchain data 140.

While exemplary operations of the system 100 have been described herein whereby the locks system 102 issues a challenge to the alarm system 104, which then responds to the challenge, it is to be understood that any of the devices 102-110 can issue a challenge to any other of the devices 102-110. Likewise, any of the devices 102-110 can respond to a challenge from any other of the devices 102-110, determine whether a challenge response is acceptable, update blockchain data based upon a challenge response, etc. Further, it is to be understood that while certain exemplary devices have been described above with respect to the exemplary system 100, the technologies described herein are suited for substantially any device that can perform computing operations and communicate over a network. It is to be understood that the proof-of-work-based security technologies described herein are especially well-suited to enhancing security of networks of devices with limited computing capabilities (e.g., microcontrollers, RFID devices, SCADA and ICS devices, etc.).

Referring now to FIG. 2, an exemplary SCADA system 200 is illustrated wherein a trusted computing device 202 detects potential attacks on a network 204 based on a proof-of-work-based security protocol. The system 200 includes the trusted computing device 202, a supervisory device 206 (e.g., a computing device executing a SCADA interface client), an RTU 208, and a PLC 210. The trusted computing device 202, the supervisory device 206, the RTU 208, and the PLC 210 communicate by way of the network 204. In the exemplary system 200 shown in FIG. 2, the network 204 is an ICS network that enables communication among the supervisory device 206, the RTU 208, and the PLC 210 to facilitate control of an industrial process. For example, the RTU 208 outputs control signals to or receives data from a plurality of field devices 212 in an industrial process. The RTU 208 can be controlled to output the control signals to the field devices 212 based upon data received from the supervisory device 206. Further, the RTU 208 can output data received from the field devices 212 to the supervisory device 206 for display at the supervisory device 206. Likewise, the PLC 210 is connected to a plurality of field devices 214, and outputs control signals to the field devices 214 based upon signals received from the supervisory device 206. Hence, an operator 216 of the supervisory device 206 can monitor and control various processes performed by the field devices 212, 214 by way of an interface of the supervisory device 206.

In many SCADA systems, a supervisory device is connected to a network other than the industrial control network, such as a business network of computers controlled by the entity that operates the industrial control network, or the Internet. The exemplary SCADA system 200 further comprises a second network 218 to which the supervisory device 206 is connected. The exemplary system 200 further includes an attack computer 220 that executes an attack on the industrial control network 204 by way of the supervisory device 206. For example, the attack computer 220 can transmit an attack communication to the supervisory device 206 that causes the supervisory device 206 to perform one or more operations that are undesirable to an entity that owns or controls the industrial control network 204. For instance, the supervisory device 206 can be caused to transmit a control signal to the RTU 208 that in turn causes the RTU 208 to operate one of the field devices 212 outside its safe operating parameters.

In the exemplary SCADA system 200, the trusted computing device 202 can detect attacks on the network 204 based upon challenge responses received from the supervisory device 206, the RTU 208, and the PLC 210. The trusted computing device 202 can be considered to be "trusted" for various reasons unrelated to the challenge-response protocol described herein such as provable security of software executing on the trusted computing device 202, physical control of the trusted computing device 202 by a trusted entity, etc. The trusted computing device 202 comprises a processor 222, memory 224 and a data store 226 that are operably coupled to the processor 222, and a display 228. The memory 224 comprises a challenge component 230, a verification component 232, and a permissions component 234. The challenge component 230 issues proof-of-work challenges to the supervisory device 206, the RTU 208, and the PLC 210 as described above with respect to the system 100. Similarly, the supervisory device 206, the RTU 208, and the PLC 210 output challenge responses to the trusted computing device 202 as described above with respect to the system 100. The verification component 232 determines whether challenge responses received by the trusted computing device 202 are acceptable responses to their respective challenges. For instance, the verification component 232 can use data included in a challenge response as input to a cryptographic function. If the result of computing the cryptographic function has a characteristic specified in the challenge to which the challenge response corresponds, the verification component 232 determines that the challenge response is an acceptable response to the challenge.

The challenge component 230 can include the predefined result characteristic in challenges issued to the supervisory device 206, the RTU 208, and the PLC 210. The characteristic can be varied by the challenge component 230 depending on which device the challenge component 230 is issuing a challenge to in order to vary the difficulty of the computing task that must be performed to respond to the challenge. For a given cryptographic function, inputs (e.g., a key-message pair) selected at random from an input space yield cryptographic function results with different characteristics at different frequencies. By way of example, computing a given cryptographic function based on randomly selected inputs in an input space can have a higher probability of yielding a result having a first Hamming weight than a second Hamming weight. The verification component 232 can therefore use different result characteristics in evaluating challenge responses from different devices in order to vary a difficulty of the computing task required by the challenge.

In an illustrative example, the challenge component 230 issues a first challenge comprising data indicative of a first result characteristic to the supervisory device 206. The challenge component 230 issues a second challenge that comprises data indicative of a second result characteristic to the RTU 208. In various embodiments, the supervisory device 206 will tend to have a greater availability of idle computing resources to perform a computing task to respond to a challenge than the RTU 208. Thus, the first result characteristic can be selected to have a lower probability of occurrence than the second result characteristic for the cryptographic function used for the challenge for an input randomly selected from an input space. A result characteristic specified in a challenge can be selected by the challenge component 230 to require a non-trivial portion of the computing resources (e.g., processing cycles, memory, power, etc.) of the challenged device in order to successfully respond to the challenge. In other examples, a result characteristic specified in a challenge can be selected by the challenge component 230 to require a desired amount of time for the challenged device to successfully respond to the challenge. The verification component 232 is configured to determine whether a challenge response is acceptable based upon the result characteristic included in the challenge by the challenge component 230. The verification component 232 can further be configured to update blockchain data 236 that is stored in the data store 226 based upon challenge responses received at the trusted computing device 202, as described above with respect to FIG. 1.

In exemplary embodiments, the permissions component 234 of the trusted computing device 202 is configured to control communications by a device on the network 204 (e.g., the supervisory device 206, the RTU 208, the PLC 210) based upon an amount of time it takes the device to provide an acceptable response to a challenge issued by the challenge component 230. By way of example, the challenge component 230 issues a challenge to the RTU 208 that is expected to take an average time of $t_1$ to complete. The time $t_1$ can depend on a difficulty of the challenge (e.g., as determined by a characteristic for the cryptographic function result that is required by the challenge), an amount of available computing resources at the RTU 208, a workload of the RTU 208 (e.g., computing tasks other than responding to the challenge that are being performed by the RTU 208), etc. Responsive to receiving an acceptable challenge response from the RTU 208 at the trusted computing device 202, the permissions component 234 can determine whether a response time between issuance of the challenge by the challenge component 230 and receipt of the challenge response at the trusted computing device 202 is anomalous based upon the expected response time $t_1$. In an example, the permissions component 234 can determine that the response time is anomalous if the response time varies from the expected response time $t_1$ by ±30%, by ±20%, or by ±10%. For instance, if the response time is slower than expected it may be indicative that the RTU 208 is executing code (e.g., attack code) that is not part of the intended programming of the RTU 208. If the response time is faster than expected, it may be indicative that an attacker has compromised the challenge-response protocol by computing acceptable responses in advance. The challenge component 230 can defend against such in-advance attacks by including randomly selected data in each of the challenges issued to devices on the network 204. By making each challenge less likely to be repeated, an attacker is inhibited from employing a known acceptable challenge response to a repeated challenge.

In other embodiments, the permissions component 234 can determine that the response time of a device is anomalous based on past responses of the device. For example, the permissions component 234 can execute an analysis over the blockchain data 236, where the blockchain data is indicative of response times of a device to past challenges. The analysis executed by the permissions component 234 can identify patterns of behavior of the device such as variations in response time at particular times of day or during performance of certain tasks. By way of example, the permissions component 234 can determine, based upon the blockchain data 236, that the PLC 210 takes longer to respond to a challenge when the PLC 210 is performing certain control operations relative to the field devices 214. Subsequently, the permissions component 234 can identify a longer-than-usual response time as being anomalous if the PLC 210 is not performing the control operations, and can identify the longer-than-usual response time as not being anomalous if the PLC 210 is performing the control operations.

Responsive to determining that the response time of a device on the network 204 is anomalous, the permissions component 234 can cause an attack notification 238 to be output by way of the display 228 to indicate to an operator (e.g., the operator 216) that an attack may have occurred on the network 204. The permissions component 234 can also control one or more aspects relative to communications on the network 204 responsive to determining that the response time of a device is anomalous. In an exemplary embodiment, the trusted computing device 202 is configured to be able to control some or all communications traffic on the network 204. For instance, the trusted computing device 202 can be configured to control whether or not other devices are able to transmit communications by way of the network 204. The permissions component 234 can prevent a device that has exhibited an anomalous response time to a challenge from communicating on the network 204. In other examples, the permissions component 234 can prevent a device that has exhibited an anomalous response time from transmitting certain types of data over the network 204 (e.g., software/firmware updates), from communicating with certain other devices, etc. For example, if the RTU 208 takes longer than expected to respond to a challenge, the permissions component 234 can prevent the RTU 208 from communicating with the PLC 210. This can prevent a potentially compromised RTU 208 from subverting the PLC 210, and by extension the field devices 214 controlled by the PLC 210.

Figure 3:
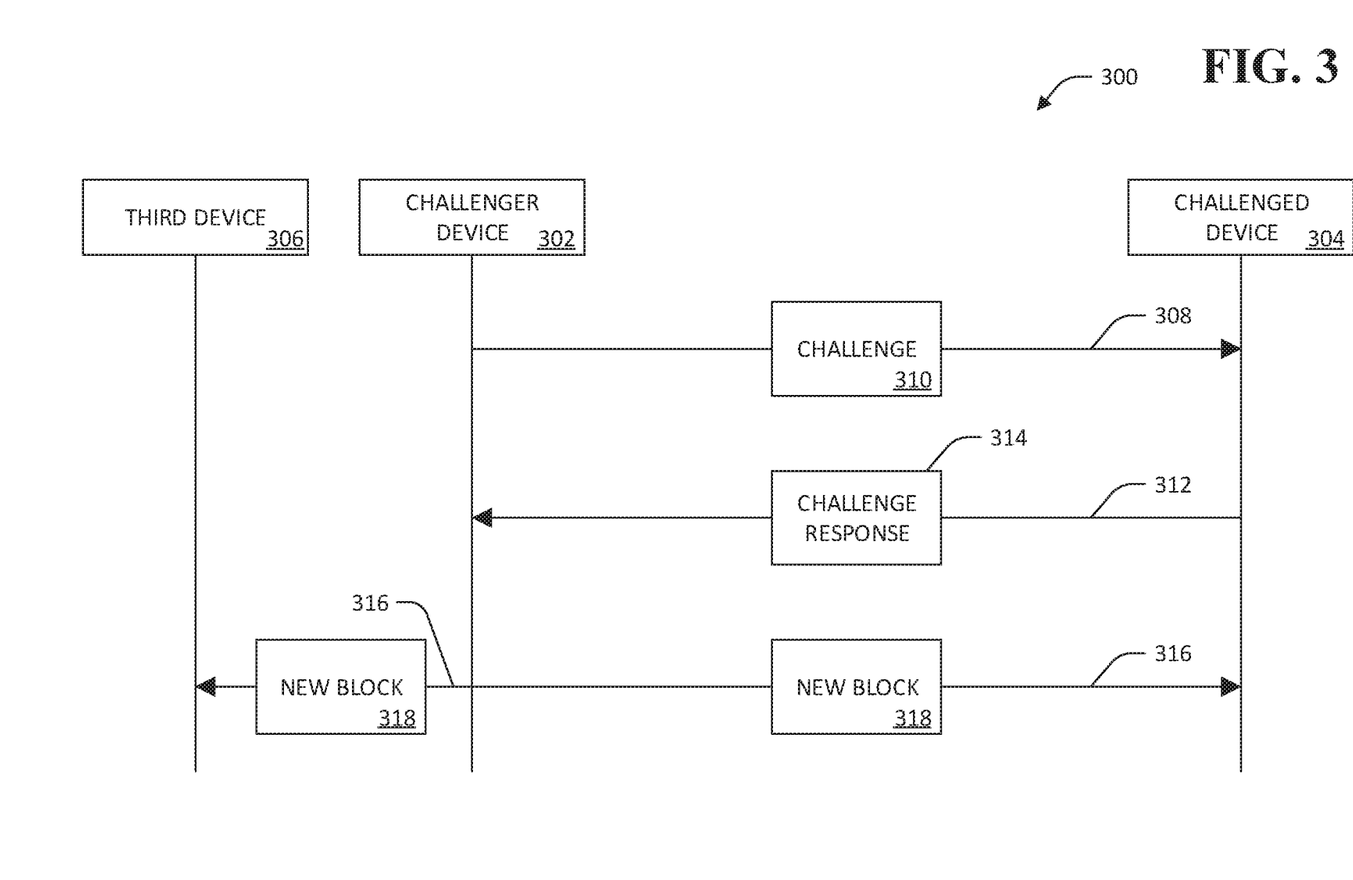
FIG. 3 is a communications flow diagram illustrating an exemplary process for proof-of-work-based network security.

Referring now to FIG. 3, a communications diagram 300 of exemplary communications on a network between a challenger device 302, a challenged device 304 (i.e., a device that receives a challenge from the challenger device 302), and a third device 306 is illustrated. At 308, the challenger device 302 transmits a challenge 310 to the challenged device 304. In an exemplary embodiment, the challenge 310 comprises a challenge identifier and an identifier of the challenger device 302. The challenge identifier can be or include a timestamp and/or randomly generated data. The challenged device 304 then performs a computing task based upon the challenge and at 312 transmits a challenge response 314 to the challenger device 302. By way of example, the challenged device performs an iterative search for a key-message pair that, when taken as inputs to a cryptographic function yield a cryptographic function result that has a predefined result characteristic. In an exemplary embodiment, in connection with computing the cryptographic function result, the key is randomly selected from a predefined keyspace, and the message comprises data included in the challenge, a response identifier that may be or include a timestamp and/or randomly generated data, and an identifier of the challenged device 304. In the exemplary embodiment, the challenge response 314 comprises the key, and data indicative of the message (e.g., the response identifier, the identifier of the challenged device 304). In some embodiments, the challenge response 314 further comprises a hash of all or part of a blockchain maintained by the challenged device 304. Responsive to receiving the challenge response 314, the challenger device 302 verifies that the challenge response is an acceptable challenge response. By way of example, the challenger device 302 computes the cryptographic function based upon a key and a message indicated in the challenge response 314, and identifies that the cryptographic function result has the predefined result characteristic. Responsive to verifying that the challenge response is an acceptable challenge response, at 316 the challenger device 302 transmits a new block 318 to the challenged device 304 and the third device 306 on the network, the new block 318 usable by the challenged device 304 and the third device 306 to update respective locally stored blockchains. In an exemplary embodiment, the new block 318 comprises a hash of all or part of data included in the challenge, the challenge response, and/or blockchain data stored by the challenger device 302.

Figure 4:
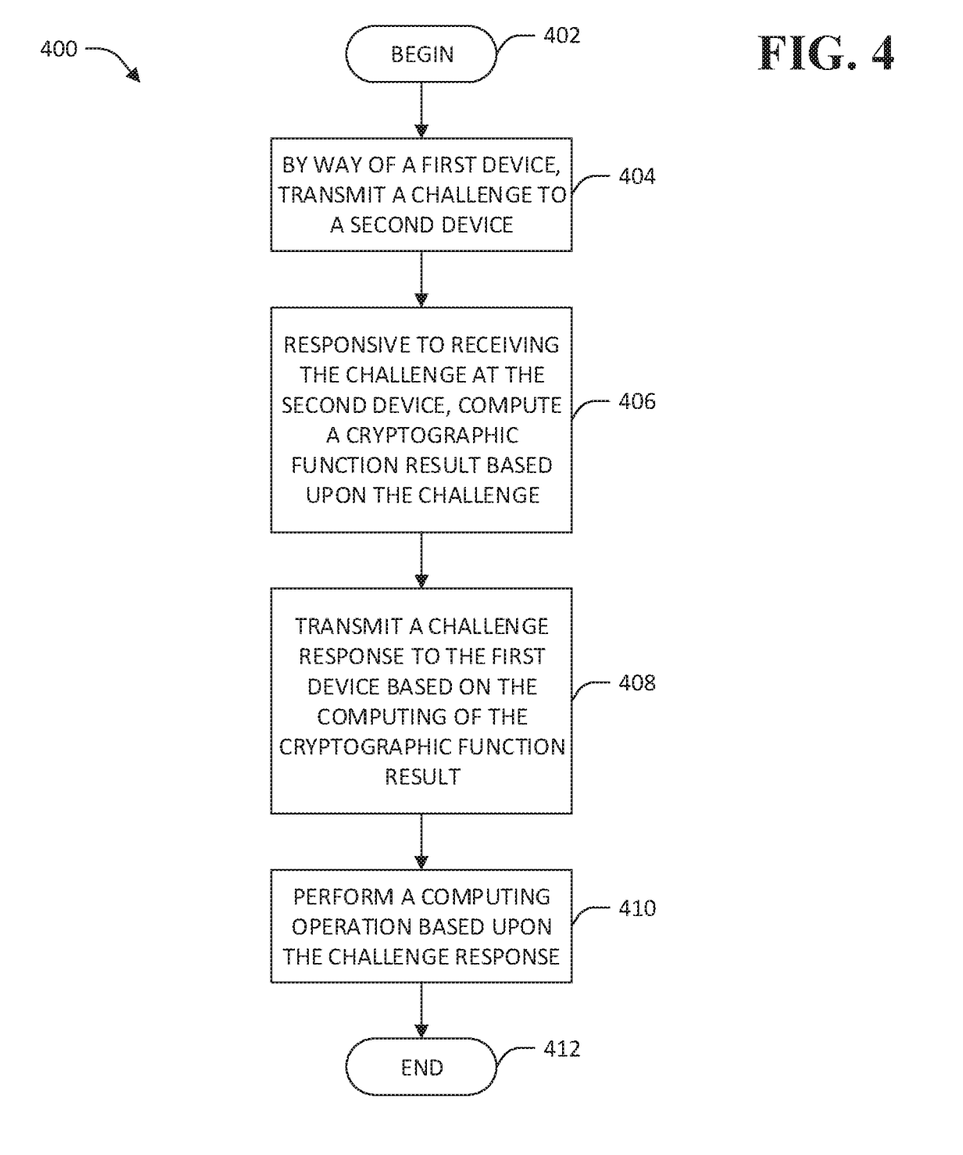
FIG. 4 is a flow diagram that illustrates an exemplary methodology for a proof-of-work-based security protocol.
Figure 5:
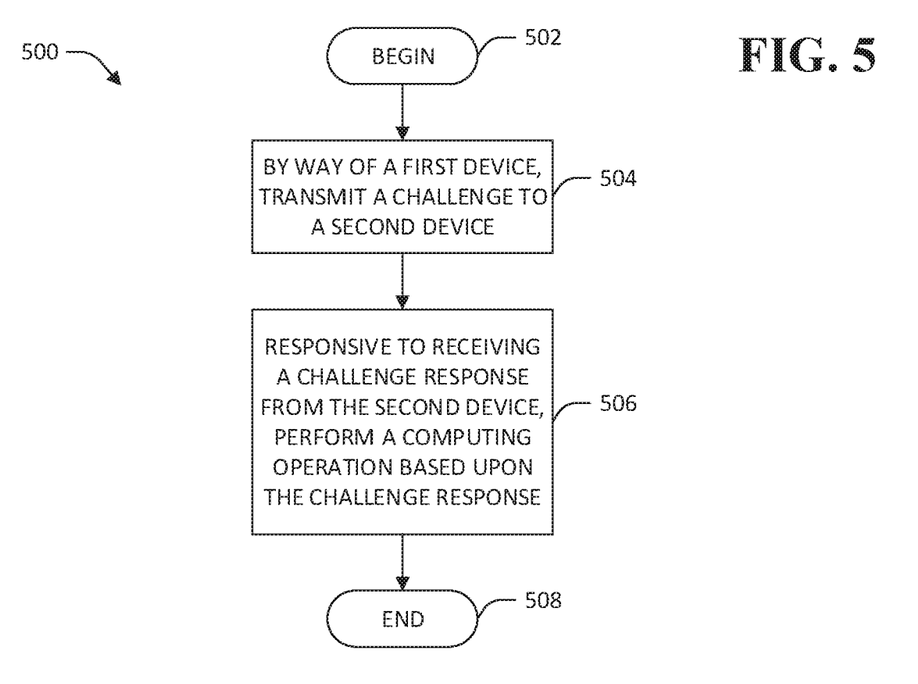
FIG. 5 is a flow diagram that illustrates an exemplary methodology for a proof-of-work-based security protocol executed by a device issuing a challenge.
Figure 6:
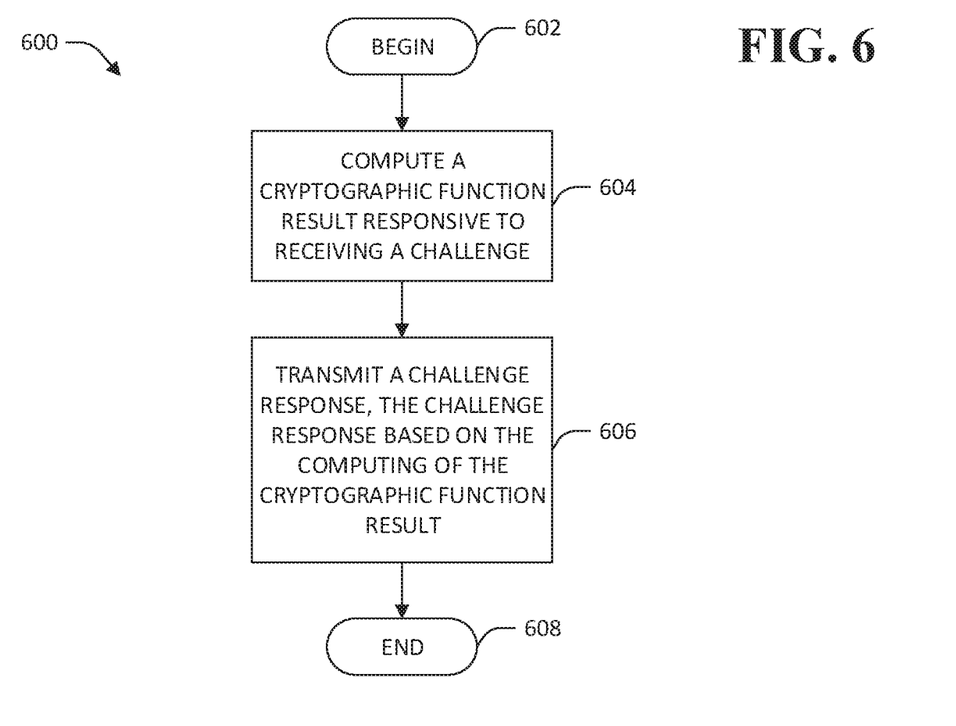
FIG. 6 is a flow diagram that illustrates an exemplary methodology for a proof-of-work-based security protocol executed by a device receiving a challenge.

FIGS. 4-6 illustrate exemplary methodologies relating to proof-of-work-based security for networked devices. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 4, a methodology 400 that facilitates proof-of-work-based security for network-connected devices is illustrated. The methodology 400 begins at 402, and at 404 a first device transmits a proof-of-work challenge to a second device on the network. At 406, responsive to receiving the challenge, the second device computes a cryptographic function result based upon the challenge. As described in greater detail above, the cryptographic function result is computed in connection with performing a search for inputs to the cryptographic function that yield a function result having a predefined result characteristic. At 408 the second device transmits a challenge response to the first device based on the computing of the cryptographic function result. For example, the second device transmits the challenge response based on determining that the computed cryptographic function result has the predefined result characteristic. At 410, the first device performs a computing operation based upon the challenge response. By way of example, and not limitation, the first device can update a blockchain stored at the first device based on determining that the challenge response is an acceptable response to the challenge. By way of another example, the first device can evict the second device from the network responsive to determining that the challenge response is not an acceptable response to the challenge. The methodology 400 ends at 412.

Referring now to FIG. 5, a methodology 500 executed by a device issuing a challenge and that facilitates a proof-of-work-based security protocol is illustrated. The methodology 500 begins at 502 and at 504 a first device transmits a challenge to a second device by way of a network. In an example, the challenge is a proof-of-work challenge that is configured to cause the second device to perform a computing task that generates data indicative of the second device having completed the computing task. At 506, responsive to receiving a challenge response from the second device at the first device, a computing operation is performed based upon the challenge response. The challenge response can include the data indicative of the second device having completed the computing task. Performing the computing operation can include verifying that the challenge response is an acceptable response to the challenge transmitted at 504, transmitting blockchain data to the second device, preventing the second device from communicating on the network, etc. The methodology 500 ends at 508.

Referring now to FIG. 6, a methodology 600 executed by a device receiving a challenge that facilitates a proof-of-work-based security protocol is illustrated. The methodology 600 begins at 602 and at 604 cryptographic function result is computed by a first device on a network responsive to receiving a challenge from a second device on the network. In exemplary embodiments, computing the cryptographic function result comprises computing a cryptographic function based upon taking a randomly selected key and a message comprising data included in the challenge as inputs to the cryptographic function. At 606 a challenge response is transmitted to the second device based on the computing of the cryptographic function result. By way of example, the challenge response can be transmitted to the second device based upon determining that the cryptographic function result computed at 604 has a predefined result characteristic (e.g., as specified in the challenge received from the second device). The methodology 600 ends at 608.

Figure 7:
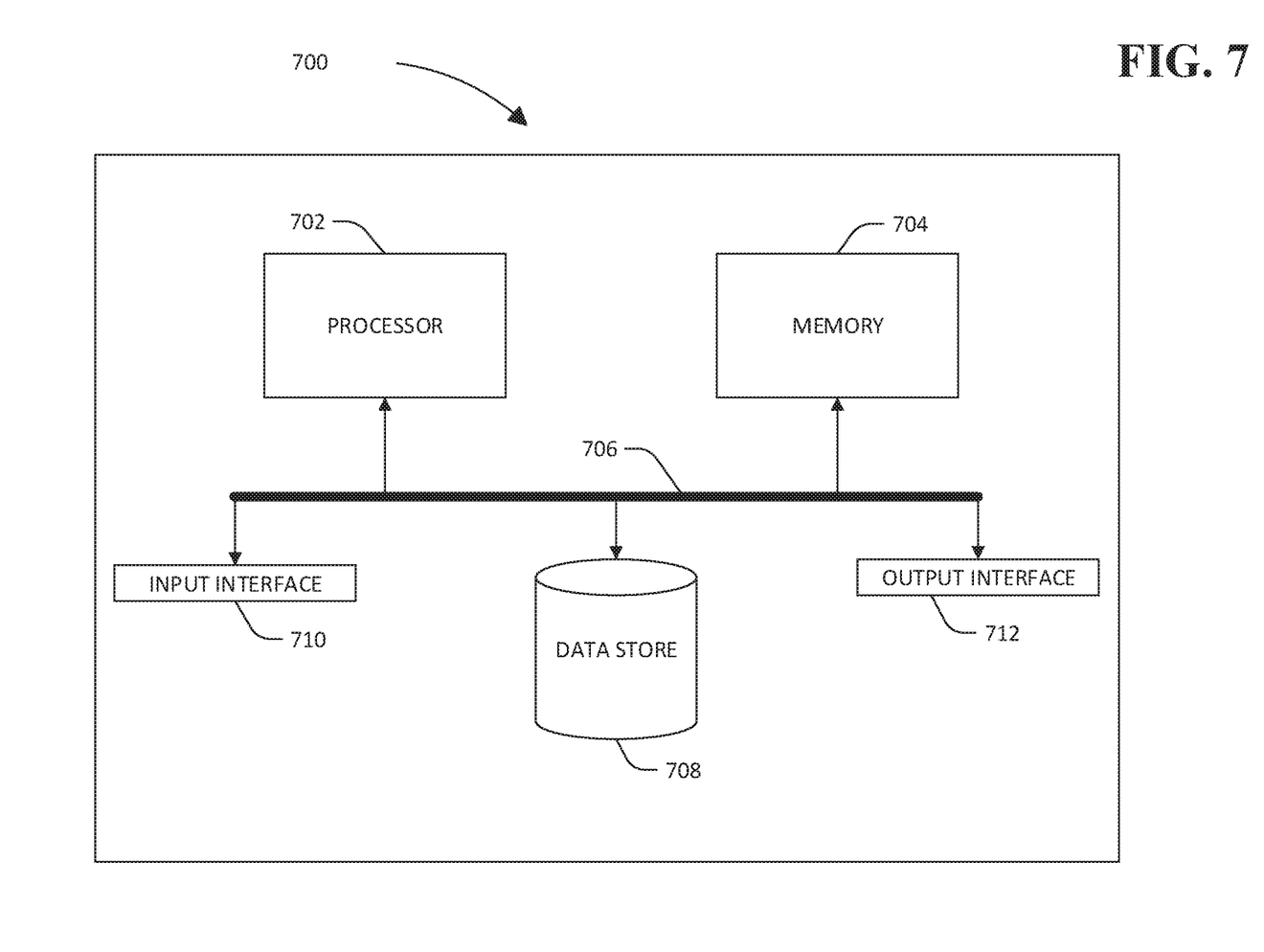
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be used in an ICS, BAS, or SCADA system to facilitate proof-of-work-based security. By way of another example, the computing device 700 can be used in connection with performing a proof-of-work-based security protocol in a distributed system of IoT-enabled devices. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store blockchain data, results of computing a cryptographic function, etc.

The computing device 700 additionally includes a data store 708 that is accessible by the processor 702 by way of the system bus 706. The data store 708 may include executable instructions, blockchain data, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A proof-of-work challenger system, comprising:
a transmitter configured to transmit transmission data;
a receiver configured to receive reception data;
a processor adapted to perform acts; and
a memory adapted to store instructions that, when executed by the processor, cause the processor to perform acts comprising:
causing the transmitter to transmit transmission data corresponding to a proof-of-work challenge to a proof-of-work challenged system, each proof-of-work challenge being unique, each proof-of-work challenge comprising data indicative of an acceptable challenge response, the data indicative of the acceptable challenge response comprising a result characteristic, and a difficulty of each proof-of-work challenge depending upon the proof-of-work challenged system;
causing the receiver to receive reception data corresponding to a challenge response based upon a cryptographic function result from the proof-of-work challenged system;
determining when the challenge response is acceptable;
determining when a response time to receive the challenge response is acceptable based upon an expected time for the proof-of-work challenged system to transmit the challenge response or the difficulty of the proof-of-work challenge, the expected time being dynamic, the response time being determined to be acceptable when the response time is longer than a first time threshold that is shorter than the expected time and when the response time is shorter than a second time threshold that is longer than the expected time threshold;
undertaking a system safe act when the challenge response is acceptable and when the response time is acceptable; and
undertaking a system subverted act when the challenge response is not acceptable or when the response time is not acceptable.

2. The proof-of-work challenger system of claim 1, wherein the system safe act comprises at least one of:
causing the transmitter to transmit transmission data corresponding to a communication based upon the challenge response;
including the proof-of-work challenged system on a whitelist;
updating a blockchain at the proof-of-work challenger system based upon the challenge response;
causing the transmitter to transmit transmission data corresponding to blockchain update data, the blockchain update data configured to cause the proof-of-work challenged system to update a corresponding blockchain; and
causing the transmitter to transmit transmission data corresponding to data indicative of a block of a blockchain stored at the proof-of-work challenger system.

3. The proof-of-work challenger system of claim 1, wherein the challenge response comprises a hash function result based upon the proof-of-work challenge.

4. The proof-of-work challenger system of claim 3, wherein the hash function result is based upon at least an identifier of the proof-of-work challenger system and a cryptographic key.

5. The proof-of-work challenger system of claim 1, the proof-of-work challenge including a timestamp or randomly selected data.

6. The proof-of-work challenger system of claim 1, wherein the system subverted act comprises at least one of:
causing the transmitter to transmit transmission data corresponding to a communication indicating the proof-of-work challenged system has been subverted;
including the proof-of-work challenged system on a blacklist;
denying a request for data from the proof-of-work challenged system;
displaying an attack notification; disabling communication by the proof-of-work challenged system;
disabling communication of certain types of data by the proof-of-work challenged system; and evicting the proof-of-work challenged system.

7. The proof-of-work challenger system of claim 2, the blockchain update data comprising a hash of at least a portion of the challenge response.

8. The proof-of-work challenger system of claim 1, wherein the proof-of-work challenger system is a device in an industrial control system (ICS) or a supervisory control and data acquisition (SCADA) system.

9. The proof-of-work challenger system of claim 1, wherein determining when the challenge response is acceptable comprises authenticating the challenge response based upon a cryptographic function result characteristic.

10. A proof-of-work challenge method comprising:
transmitting a proof-of-work challenge to a proof-of-work challenged system, each proof-of-work challenge being unique, each proof-of-work challenge comprising data indicative of an acceptable challenge response, the data indicative of the acceptable challenge response comprising a result characteristic, and a difficulty of each proof-of-work challenge depending upon the proof-of-work challenged system;
receiving a challenge response from the proof-of-work challenged system at a proof-of-work challenger system, the challenge response generated by the proof-of-work challenged system based upon a result of a cryptographic function being computed by the proof-of-work challenged system based upon the proof-of-work challenge;
determining when the challenge response is acceptable;
determining when a response time to receive the challenge response is acceptable based upon an expected time for the proof-of-work challenged system to transmit the challenge response or the difficulty of the proof-of-work challenge, the expected time being dynamic, the response time being determined to be acceptable when the response time is longer than a first time threshold that is shorter than the expected time and when the response time is shorter than a second time threshold that is longer than the expected time threshold;
undertaking a system safe act when the challenge response is acceptable and when the response time is acceptable;
and undertaking a system subverted act when the challenge response is not acceptable or when the response time is not acceptable.

11. The proof-of-work challenge method of claim 10, wherein the system safe act comprises at least one of:
causing the transmitter to transmit transmission data corresponding to a communication based upon the challenge response;
including the proof-of-work challenged system on a whitelist;
updating a blockchain at the proof-of-work challenger system based upon the challenge response;
causing the transmitter to transmit transmission data corresponding to blockchain update data, the blockchain update data configured to cause the proof-of-work challenged system to update a corresponding blockchain; and
causing the transmitter to transmit transmission data corresponding to data indicative of a block of a blockchain stored at the proof-of-work challenger system.

12. The proof-of-work challenge method of claim 10, wherein the system subverted act comprises at least one of:
causing the transmitter to transmit transmission data corresponding to a communication indicating the proof-of-work challenged system has been subverted;

including the proof-of-work challenged system on a blacklist;

denying a request for data from the proof-of-work challenged system;

displaying an attack notification; disabling communication by the proof-of-work challenged system;

disabling communication of certain types of data by the proof-of-work challenged system; and evicting the proof-of-work challenged system.

13. The proof-of-work challenge method of claim 10, wherein the challenge response comprises a hash function result based upon the proof-of-work challenge, the hash function result being based upon at least an identifier of the proof-of-work challenger system and a cryptographic key.

14. The proof-of-work challenge method of claim 10, the proof-of-work challenge including a timestamp or randomly selected data.

15. The proof-of-work challenge method of claim 10, wherein determining when the challenge response is acceptable comprises authenticating the challenge response based upon a cryptographic function result characteristic.

\* \* \* \* \*